April 1, 1958     J. W. MURRAY     2,828,955
TACHOMETER INDICATOR
Filed Aug. 26, 1953
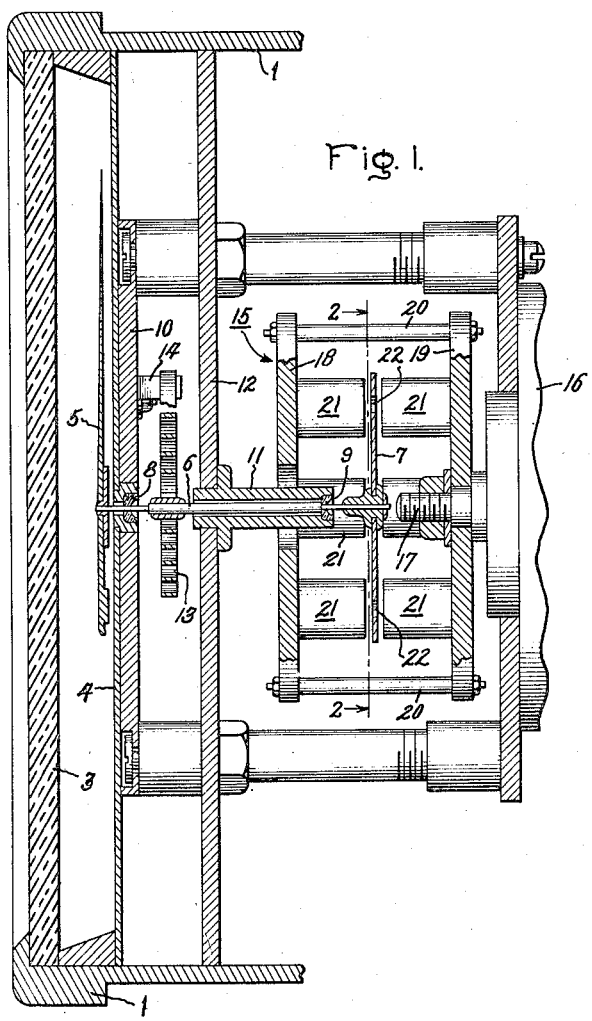
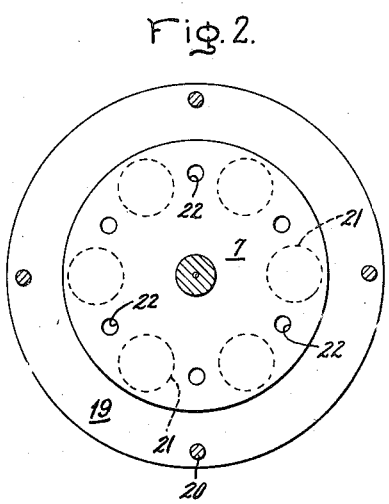
Inventor:
John W. Murray,
by Richard E. Hosley
His Attorney.

United States Patent Office 2,828,955
Patented Apr. 1, 1958

2,828,955
TACHOMETER INDICATOR

John W. Murray, Marblehead, Mass., assignor to General Electric Company, a New York corporation Application August 26, 1953, Serial No. 376,697

2 Claims. (Cl. 264—13)

The present invention relates to sensitive tachometer indicators and, more particularly, to tachometer indicating mechanisms having oscillatory arrangements for minimizing bearing frictions.

It has been earlier appreciated that the effects of vibration upon sensitive low-torque instrument shafts mounted in low-friction bearings may be distinctly beneficial, in that peaks of friction and tendencies to lock are thereby opposed. For example, certain aircraft instruments having only relatively small actuating torques have been aided in producing excellent output accuracies and reliability by virtue of the high frequency vibrations of their shafts in their bearings, induced by pulsations emanating from reciprocating engines. Apparently small amplitude and high frequency vibratory movements of shafts in their support bearings reduced net loading in any direction and thereby precluded sticking between shaft and bearing surfaces. The absence of such sustained vibrations in jet aircraft has now occasioned instrument friction problems which were hitherto resolved automatically aboard piston-driven craft and, in the particular case of tachometer indicators, the small available drive torques, the uncompromising demand for highest accuracy and reliability, and the inadequacies of conventional low-cost bearings, have rendered the former design of these instruments unsuitable for the measurement of aircraft jet engine speeds.

In accordance with the teachings of the present invention, the friction characteristics of tachometer indicator mechanisms are vastly improved by the automatic introduction of unique small-amplitude angular oscillations of the indicator output shaft, the tachometer drag disk being provided with structural irregularities of a predetermined pattern to introduce the required vibratory movements. The oscillatory movements possess only small amplitudes and are of frequencies sufficiently high to render pointer oscillations hardly perceptible. Conventional low-friction bearings may be employed in such instruments, without sacrificing accuracy, and, inasmuch as the oscillatory movements are produced angularly about the axis of rotation rather than at random or radially between pivots and bearings, a close mating of pivots and bearings may be utilized to preserve further accuracies and to eliminate undue play between parts. The tachometer indicator arrangement with which this invention is concerned is that wherein a set of permanent magnets is rotated mechanically, at a speed to be measured, and wherein a proximate conductive eddy current drag disk is angularly deflected thereby in opposition to a spiral spring restraint, the drag disk being mounted on a shaft which drives the indicator pointer or pointers. Torque pulsations of the desired character are caused to appear about the drag disk shaft because of irregularities, such as corrugations or openings, in the drag disk which are so spaced and proportioned in relation to the permanent magnets that the required drag torque variations obtain. Although it has been known to provide critically proportioned slots in tachometer drag disks or cups, resort has been had to these for the avowed purpose of enhancing drag torque by re-routing eddy currents in preferred flow directions, and the relative magnet and slot spacings have been designed to minimize or eliminate fluctuations in torque. By way of contradistinction, the instant arrangement yields an average torque which is somewhat reduced from that which would occur without the pattern of drag disk imperfections and, further, this pattern is instrumental in producing torque oscillations, the resulting improvement in friction characteristics more than offsetting the minor losses in torque and minute pointer vibrations.

Accordingly, it is one of the objects of this invention to provide novel and improved arrangements for minimizing friction effects in tachometer indicators.

Further, it is an object to provide a sensitive magnetic tachometer indicator mechanism having an angularly movable drag disk shaft which is automatically oscillated in angular directions by variations in the interaction between the drag disk and actuating magnets.

By way of a summary account of one aspect of this invention, a tachometer indicator having a set of equally spaced permanent magnets rotated by apparatus the speed of which is to be measured is provided with an eddy current drag disk having equally spaced perforations which are disposed to interrupt simultaneously the cutting of magnetic flux by conductive portions of the drag disk. Since the drag disk is angularly restrained in a stationary position by a spring, the drag disk experiences pulsations of torque about its axis of deflection, these pulsations being of the same number as the disk perforations during each revolution of the set of magnets. Jewel bearings support the drag disk shaft, which shaft also mounts the tachometer pointer in its relation to a scale, and these bearings are designed to afford the least possible radial vibration of the shaft consistent with low angular friction. The ensuing oscillations of the shaft and pointer, induced by the drag disk torque pulsations, are almost wholly in angular directions and serve to overcome peaks of bearing friction.

Although the features of this invention which are believed to be novel are set forth in the appended claims, greater detail of the invention in its perferred embodiments and the further objects and advantages thereof may be readily comprehended by reference to the following description taken in connection with the accompanying drawing, wherein—

Fig. 1 is a partly sectionalized side elevation of the front end of a tachometer indicator mechanism incorporating this invention and Figs. 2, 3 and 4 represent plan views of tachometer drag elements having patterns of irregularities suitable for the production of pointer oscillation torques.

In Fig. 1, the front end indicator mechanism is illustrated as comprising the conventional front flange 1, instrument window 3, dial scale 4, and instrument pointer 5 angularly actuated by the output shaft 6. At its opposite end, shaft 6 mounts a conductive eddy current drag disk 7, and bearing support is provided by a pair of jewel bearings 8 and 9, the former being mounted in the forward instrument frame bracket 10 and the latter in a bearing support 11 affixed to the more rearwardly positioned frame bracket 12. Jewels 8 and 9 effectively preclude both lateral and radial vibration of shaft 6 because of their close fit with the shaft surfaces and their spacing along the shaft axis. Resilient restraint for the output shaft 6 is provided by a spiral spring 13 which has its inner end connected with shaft 6 and its outer end affixed to a tab 14 frame bracket 10. Actuating torque for the deflection of pointer 5 and output shaft 6 is derived through interaction between the eddy current drag element 7 and a drag magnet assembly 15 which is rotated collinearly with output shaft 6 by a synchronous motor 16. Motor 16 is electrically coupled with a synchronous generator, not illustrated, such that the motor shaft 17 rotates the magnet assembly at the same speed as and synchronously with the generator rotor shaft.

Assembly 15 comprises two plates 18 and 19, which are fixed in a parallel relationship by spacers 20, and each plate has six equally spaced cylindrical permanent magnets 21 attached thereto and disposed such that opposite poles of the magnets face each other across a narrow air gap. Drag disk 7 is located in the gap between the two sets of magnets and intercepts the lines of magnetic flux concentrated there. With disk 7 constructed as a solid conductive element, as is conventional, the eddy currents induced therein by the rapidly rotated magnetic fields from the magnets 21 produce fluxes which in turn react with the permanent magnet fluxes to exert a torque upon drag element 7. For any given speed of rotation of the magnet assembly a uniform predetermined torque is achieved, and the disk 7 seeks to drive pointer 5 to an angular position at which the torque impressed by restraining spring 18 is exactly equal and opposite. However, as has been mentioned earlier, the action of these smooth torques may be disturbed by sticking of the pointer shaft in its bearings, due to such causes as irregularities in the bearing surfaces, contamination, or forces attending acceleration, such that the pointer will not respond accurately and false data will be represented. To secure a rapid minute angular oscillation of the pointer shaft and thereby overcome these difficulties, the disk 7 is provided with perforations 22 which are equally spaced angularly at a radial distance from the shaft 6 which is about the same as the radial spacing of permanent magnets 21. This pattern of disk perforations is best represented in Fig. 2 which is a view defined by the section line 2—2 in Fig. 1. It will be observed that the perforations 22, being the same in number and in angular spacing as the poles of magnets 21, will permit maximum disk torque to be developed when all perforations are most remote from the magnet poles, as shown. As the magnets 21 are rotated clockwise they next reach a minimum torque position, at which all perforations are directly opposite pole faces. These alternations of torque occur six times for each revolution of the magnet assembly, and the effect is to superimpose a low amplitude ripple torque upon the general level of torque which is generated. This results in angular oscillation of shaft 6 because spring 18 urges the pointer shaft counterclockwise by a small angular amount each time the minimum torque condition occurs.

In Fig. 3, twelve perforations are depicted, all with equi-angular spacing, the frequency of the resulting torque pulsations being twelve times the speed of the magnet assembly rotations. A like beneficial effect obtains with other similarly patterned disk irregularities which periodically lessen the torque developed by disk and magnet interaction. Such an alternative arrangement appears in Fig. 4, wherein a pattern of equally spaced radial disk corrugations 23 yield the desired effect. At each corrugation, the eddy current flow pattern is different from that at the plane intervening portion, as are the resulting disk torques, and torque pulsations are realized.

It has been determined that the shaping of apertures, corrugations or other suitable disk irregularities is not critical. The torque pulsations must, of course, be of sufficient amplitude to effectuate an angular oscillation of the pointer shaft, and yet the pointer oscillations must be of small enough amplitude to permit the pointer to be read accurately against scale markings. An increased number and size of disk perforations will result in greater amplitude of oscillation, up to the point where the disk material between perforations is so reduced that the maximum torques developed there are lessened. Also, the perforations should be spaced equally with the magnet poles, else the torque pulsations are reduced in amplitude or even further cancel and become of negligible effect. Generally, the frequency of oscillation, regulated by the number of perforations or other irregularities, should be several times the magnet assembly speed, to preclude such reinforcement of any natural frequency vibrations, originating in the motor and magnet assembly, that the pointer will waver angularly and become useless as an indicator. The amplitude of torque pulsations should be small in relation to the average torques developed in the normal range of speeds measured, as may be determined by the size and number of disk irregularities, and the restraining spacing torque and magnet strengths will further influence these design criteria of the disk.

In those indicators employing a gear train to actuate one or more pointers, the oscillations developed by the aforementioned structure are additionally and particularly advantageous in precluding jamming or erratic binding. Although a disk-type eddy current drag element has been referred to, this element may be replaced by a cup-shaped element having the same characteristics here disclosed, with equal advantage.

Inasmuch as the specific embodiments of this invention disclosed herein are of a descriptive rather than a limiting nature, it will be apparent that modifications, combinations, or substitutions may be employed in accordance with these teachings without departing in spirit or scope from this invention in its broader aspects.

What I claim as new and desire to secure by Letters Patent of the United States is:

1. A low friction tachometer indicator comprising a rotatable magnet assembly having a plurality of pairs of oppositely disposed permanent magnets equi-angularly spaced about the axis of rotation of said assembly at a uniform radial distance therefrom, a synchronous electrical motor for rotating said assembly at speeds to be indicated, an indicator output shaft, low friction bearing means supporting said shaft for angular deflection about said axis, resilient restraining means opposing deflection of said output shaft, pointer means actuated by said output shaft, a disk-shaped conductive member mounted on said shaft in the gap between said oppositely disposed magnets and having equi-angularly spaced openings which are of the same number as said pairs of magnets and have substantially the same uniform radial spacing, whereby the torque between said drag member and magnet assembly is lessened and said resilient means moves said shaft and pointer by a small angular amount each time said openings are disposed opposite said magnets.

2. In a tachometer indicator wherein pointer means are angularly deflected in accordance with the speed of rotation of a magnet assembly having equi-angularly spaced magnet poles at a uniform radial distance from the axis of rotation thereof, the low friction oscillatory coupling between said pointer means and magnet assembly comprising a conductive member angularly movable about said axis in inductive relationship with said magnet poles and having a plurality of apertures therethrough, all of which apertures are disposed to be simultaneously and periodically aligned with said magnet poles, an output shaft coupled with said conductive member and transmitting deflections and angular oscillations of said conductive member to said pointer means, low friction bearing means supporting said output shaft for angular deflection and oscillation, and resilient means restraining deflections of said shaft and angularly oscillating said shaft in accordance with periodic minute variations in deflecting torques imposed upon said conductive member by said magnet assembly.

References Cited in the file of this patent

UNITED STATES PATENTS

| Number | Name | Date |
| --- | --- | --- |
| 759,041 | Storer | May 3, 1904 |
| 1,312,083 | Smith | Aug. 5, 1919 |
| 2,119,819 | List | June 7, 1938 |
| 2,401,839 | Norman | June 11, 1946 |
| 2,408,163 | Fodor | Sept. 24, 1946 |
| 2,596,649 | Butler | May 13, 1952 |
| 2,649,559 | Wargo | Aug. 18, 1953 |